United States Patent [11] 3,536,242

[72] Inventors Phillip B. Gordon Jr.
 Washington;
 Calvin D. Loyd, Peoria; Eugene R. Martin,
 East Peoria; and Theodore L. Oberle,
 Washington, Illinois
[21] Appl. No. 725,467
[22] Filed April 30, 1968
[45] Patented Oct. 27, 1970
[73] Assignee Caterpillar Tractor Company
 Peoria, Illinois
 a corporation of California

[54] FRICTION WELDING APPARATUS
 6 Claims, 2 Drawing Figs.
[52] U.S. Cl................................................. 228/2,
 29/470.3, 156/73
[51] Int. Cl....................................................... B23k 27/00
[50] Field of Search............................................ 228/2;
 29/470.3; 156/73

[56] References Cited
 UNITED STATES PATENTS
 3,235,158 2/1966 Hollander..................... 228/2
 3,273,233 9/1966 Oberle et al................... 24/470.3

Primary Examiner—John F. Campbell
Assistant Examiner—Robert J. Craig
Attorney—Fryer, Tjensvold, Feix, Phillips and Lempio ABSTRACT: An inertial welding machine having a tailstock assembly mounted on a base structure and cantilevered parallel tie bars extending away from the tailstock assembly to support an axially movable spindle assembly. A pressure loading assembly for urging the spindle assembly toward the tailstock is also mounted on the parallel tie bars and is coupled to the spindle assembly through a variable lever and adjustable coupling for adapting the welding apparatus to weld pieces of different lengths and for adjusting the pressure loading force exerted upon the spindle assembly.

Patented Oct. 27, 1970
3,536,242
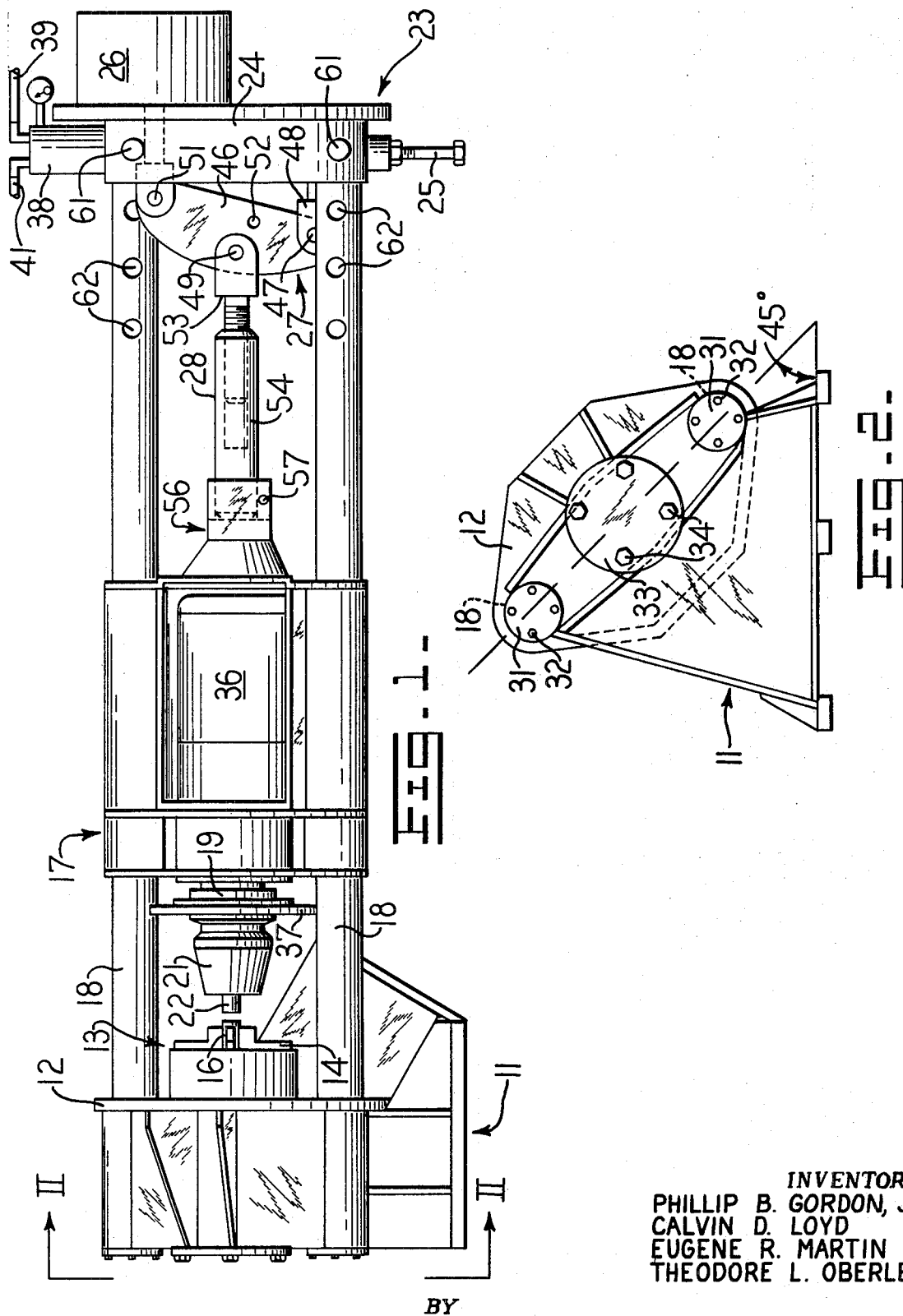
INVENTORS
PHILLIP B. GORDON, JR.
CALVIN D. LOYD
EUGENE R. MARTIN
THEODORE L. OBERLE
BY
ATTORNEYS

FRICTION WELDING APPARATUS

Friction welding machines generally comprise a tailstock assembly with a nonrotatable chuck for securing a first weld piece and a spindle assembly having a rotatable chuck for mounting a second weld piece. The rotatable chuck is driven in rotation and the weld pieces are brought into axial engagement at a common interface which is heated to suitable plasticity for joining of the parts by the frictional rubbing of the parts at their interface. In inertial welding, the spindle is rotated to a selected speed along with an associated inertial mass prior to axial engagement of the weld pieces. As the weld pieces are brought into engagement under pressure, driving of the spindle is terminated and all of the kinetic energy of the inertial mass is consumed at the interface of the relatively rotating weld pieces. To achieve a suitable weld, it is necessary to closely control the alignment of the parts, the rotational speed of the rotatable chuck, the inertia of the rotating mass, and the amount of pressure applied through the weld interface. Prior art welding apparatus has generally included relatively massive parts and complicated mechanisms to obtain the close control necessary. Versatility of such welding apparatus has been limited because of the difficulty in providing a wide range of the above parameters for a variety of weld pieces and desired welding conditions.

The present invention provides friction welding apparatus which is adaptable to welding of a large variety of weld pieces. In particular, the present apparatus permits application of a wide range of welding pressures by operatively connecting pressure loading means with an axially movable chuck assembly through variable lever means. The further addition of an adjustable coupling between the variable lever means and axially movable spindle assembly permits, for example, further separation of the spindle assemblies between welding operations to facilitate removal of welded pieces and insertion of weld pieces to be subsequently joined. Construction of the welding apparatus is further simplified by mounting the axially movable chuck assembly upon parallel tie bars for proper alignment with the nonrotatable chuck.

Additional advantages and objects of the present invention are made apparent in the following description having reference to the accompanying drawing wherein:

FIG. 1 is a side view in elevation of the present welding apparatus and

FIG. 2 is an end view of the welding apparatus taken from the left side of FIG. 1.

Having particular reference to FIG. 1, the present inertial welding apparatus is comprised basically of three different assemblies. A base structure 11 has a mounting bracket 12 to which is secured the tailstock chuck assembly 13. The tailstock assembly supports a nonrotatable chuck 14 for releasably securing a first weld piece 16. A spindle assembly 17 is mounted for axial motion upon parallel tie bars 18 as discussed in greater detail below. The spindle assembly has a rotatable spindle 19 supporting a rotatable chuck 21 for releasably securing a second weld piece 22 in axial alignment with the first weld piece 16. A pressure loading assembly 23 is mounted at the opposite ends of the tie bars 18 from the tailstock assembly and has a support bracket 26 for mounting suitable pressure loading means 26. The pressure loading means may be a hydraulic pressure cylinder capable, for example, of exerting a maximum force of approximately 10,000 pounds. Horizontal alignment of the welding apparatus is maintained by adjustable leveling means 25 on the pressure loading assembly.

According to the present invention, the pressure loading means 26 is operatively coupled to the axially movable spindle assembly 17 through a variable lever arrangement 27 to permit variation of the axial pressure loading to be applied between the weld pieces. The lever arrangement 27 is effectively coupled to the axially movable spindle assembly 17 by means of an adjustable loading shaft 28 to permit, for example, increased axial movement of the assembly 17 between welding operations and thus facilitate removal of joined weld pieces and insertion of weld pieces to be subsequently joined.

To describe the spindle assembly 17 and the mounting bars 18 in greater detail, the bars 18 are cantilevered from the base structure 11 to extend in parallel relation past the tailstock assembly 13. The tie bars 18 are disposed in a plane at approximately 45° from horizontal (as shown in FIG. 2) to improve operator access to the chucks 14 and 21. Referring to FIG. 2, plates 31 and screws 32 secure the bars 18 to the machine base and plates 33 and screws 34 are for similar mounting of the tailstock assembly 13.

Referring again to FIG. 1, the spindle assembly 17 is slidably mounted on the tie bars 18 and includes drive means, for example, an electric motor 36, for driving the rotatable chuck 21 in rotation. An inertial mass comprising one or more flywheels, one being indicated at 37, for example, is associated for rotation with the rotatable chuck 21 as in conventional inertial welding techniques. With the spindle assembly 17, including the drive motor 36, slidably mounted on the tie bars and the tailstock assembly secured to the machine base 11, structural requirements for the welding machine are substantially reduced. During the welding operation, energy to be consumed at the interface of the weld pieces is stored in the rotating inertial masses, including flywheel 37. Accordingly, there are substantially no torsional forces applied to the tie bars 18 during welding to result in misalignment of the weld pieces. Thus the simple tie bar arrangement is particularly effective with an inertial welding machine of the present arrangement shown in FIG. 1. The spindle 19 may be mounted for rotation upon suitable spindle bearings (not shown). Lubrication for the spindle bearings is provided by an oil mister 38 which is mounted on the pressure loading assembly 23. Compressed air for operating the mister is provided through a conduit 39 and lubricating oil mist is communicated from the mister 38 to the spindle bearings (not shown) through a flexible hose 41.

The variable lever arrangement 27 has a lever member 46 which pivots about a fulcrum point 47 provided by a bracket 48 which is mounted upon the support bracket 24. The lever member 46 has a pivot point 49 to which the adjustable load shaft 28 is connected. The lever member 46 also has two pivot points 51 and 52 so that the pressure loading means 26 may be connected to the lever member at either position. With the loading shaft pivot point 49 situated generally at the midlength of the lever and the loading means 26 connected to the end pivot point 51 as shown in FIG. 1, the variable lever provides a loading ratio of approximately 2 to 1. With the loading means 26 shifted for attachment to the other pivot point 52, the loading ratio is changed to approximately 0.81 to 1. Numerous variations of the variable lever arrangements are possible within the scope of the present invention. For example, additional pivot points could be provided for the loading means 26 to permit greater variation of the loading ratio.

To permit more flexible operation of the welding machine, the adjustable coupling 28 has a threaded yoke member 53 which is pivotally secured at 49 to the lever member 46. A tapped shaft 54 is mounted on the threaded yoke member and extends toward a loading bracket 56 upon the spindle assembly 17. Alignment of the shaft 54 within the loading bracket 56 is maintained by means of a pin 57. To commence a welding operation, the shaft 28 is pivoted upwardly so that the spindle assembly 17 may be shifted further to the right to facilitate loading of weld pieces into chucks 14 and 21. The shaft 28 is then pivoted downwardly again for alignment with the loading bracket 56 to provide the operative connection between the lever member 46 and the spindle assembly 17. The variable lever arrangement 27 permits the operator to more readily select the loading pressure to be applied upon the spindle assembly 17 by the pressure loading means 26. To provide still greater versatility, particularly for adaptation of the welding apparatus to weld pieces of substantially varying lengths, the pressure loading assembly is mounted upon the tie bars by means of pins 61. Additional mounting holes 62 are provided along the lengths of the tie bars 18 to receive the pin 61 so that the pressure loading assembly may be rapidly and simply repositioned relative to the tailstock assembly 13.

We claim:
1. Friction welding apparatus comprising in combination:
a base structure;
a tailstock assembly including a nonrotatable chuck for holding one weld piece being secured to the base structure;
a spindle assembly including a rotatable chuck for holding another weld piece, said spindle assembly being slidably supported on parallel tie bars which are cantilevered outwardly from the tailstock assembly to maintain the rotatable chuck in axial alignment with the nonrotatable chuck,
a pressure loading assembly for axially shifting said spindle assembly and urging the weld pieces into engagement, said pressure loading assembly being secured to the cantilevered ends of the tie bars; and
6. The combination of claim 1 wherein said axially movable spindle assembly includes means for driving said rotatable chuck and an inertial mass associated for rotation with said rotatable chuck.

UNITED STATES PATENT OFFICE
CERTIFICATE OF CORRECTION

Patent No. 3,536,242                            October 27, 1970

Phillip B. Gordon, Jr., et al.

It is certified that error appears in the above identified patent and that said Letters Patent are hereby corrected as shown below:

Column 4, line 5, after "tie bars; and" insert -- variable lever means interconnected between said pressure loading assembly and said axially movable chuck assembly for application therethrough of variable pressure loading force.

2. The combination of claim 1 further comprising an axially adjustable loading shaft for coupling said variable lever means and said axially movable spindle chuck assembly to permit accommodation of weld pieces of varying length in the welding apparatus and to facilitate insertion and removal of the weld pieces.

3. The combination of claim 1 wherein said variable lever means is carried by said pressure loading assembly and further comprising means for securing said loading assembly to said tie bar means at variable distances from said axially secured chuck assembly.

4. The combination of claim 1 wherein said pressure loading assembly comprises motor means for applying said pressure loading and said variable lever means comprises a member having a fulcrum fixed relative to said pressure loading assembly and at least three pivot points for selective coupling with said motor means and said axially movable chuck assembly.

5. The combination of claim 4 wherein said motor means in a hydraulic pressure cylinder capable of exerting a variable pressure loading force. --.

Signed and sealed this 30th day of March 1971.

(SEAL)
Attest:

EDWARD M. FLETCHER, JR.                      WILLIAM E. SCHUYLER, JR.
Attesting Officer                                  Commissioner of Patents